United States Patent
Park

(10) Patent No.: US 8,818,164 B2
(45) Date of Patent: Aug. 26, 2014

(54) METHOD OF REPRODUCING TRANSPORT STREAM IN VIDEO APPARATUS AND VIDEO APPARATUS USING THE SAME

(75) Inventor: Dae Suk Park, Daegu (KR)

(73) Assignee: LG Electronics Inc., Seoul (KR)

( * ) Notice: Subject to any disclaimer, the term of this patent is extended or adjusted under 35 U.S.C. 154(b) by 1873 days.

(21) Appl. No.: 11/435,733

(22) Filed: May 18, 2006

(65) Prior Publication Data

US 2007/0133607 A1 Jun. 14, 2007

(30) Foreign Application Priority Data

Dec. 12, 2005 (KR) .......................... 10-2005-0121608

(51) Int. Cl.
*H04N 9/80* (2006.01)

(52) U.S. Cl.
USPC .......................................................... 386/241

(58) Field of Classification Search
None
See application file for complete search history.

(56) References Cited

U.S. PATENT DOCUMENTS

| | | | |
|---|---|---|---|
| 6,757,906 B1 | 6/2004 | Look et al. | |
| 6,971,121 B2 | 11/2005 | West et al. | 725/142 |
| 2003/0122966 A1* | 7/2003 | Markman et al. | 348/563 |
| 2003/0190138 A1* | 10/2003 | Yuen et al. | 386/46 |
| 2005/0086703 A1 | 4/2005 | Gupta et al. | |
| 2006/0150225 A1* | 7/2006 | Hegg et al. | 725/89 |
| 2008/0155418 A1* | 6/2008 | Vallone et al. | 715/720 |

FOREIGN PATENT DOCUMENTS

KR 10-2004-0071453 A 8/2004

OTHER PUBLICATIONS

Korean Office Action dated Dec. 11, 2006.

Steiger, O., et al., "MPEG-Based Personalixed Content Delivery", *Proceedings 2003 International Conference on Image Processing*, Barcelona, Spain, Sep. 14-17, 2003, 2:45-48.

* cited by examiner

*Primary Examiner* — William C Vaughn, Jr.
*Assistant Examiner* — Daniel Tekle
(74) *Attorney, Agent, or Firm* — KED & Associates LLP

(57) ABSTRACT

A transport stream reproducing method and a video apparatus such as a digital television receiver having a personal video recorder or PVR using the same are provided to facilitate the locating and reproducing of a specific point of a stored transport stream constructed of a plurality of transport packets according to the progress of a time control function. The method reproduces a transport stream in a video apparatus such as a digital television receiver including a PVR for storing a transport stream according to the time control function. The method includes storing, in the PVR, the transport stream together with file identification information corresponding to packets of the transport stream; displaying a progress bar indicating a progress status of the storing of the transport stream; storing, in a first storage unit, bookmark information set in response to a user command input for setting at least one bookmark with respect to the displayed progress bar, the bookmark information corresponding to the file identification information of at least one packet among the transport packets constructing the stored transport stream; displaying the at least one bookmark on the progress bar at a position corresponding to the user command input; and reproducing, in response to a bookmark selection made by a user selecting one of the at least one bookmark, the stored transport stream from the at least one packet corresponding to the set at least one bookmark, the reproducing using the file identification information of a packet corresponding to the selected bookmark. Thus, file information stored in packet units is used as information for reproduction from a specific point of a transport stream stored in a random address sequence, and bookmark information and random position assignment information of the storage unit can be used by a controller to reproduce the packets of a transport stream randomly stored in the storage unit from a specific point of reproduction.

19 Claims, 5 Drawing Sheets

METHOD OF REPRODUCING TRANSPORT STREAM IN VIDEO APPARATUS AND VIDEO APPARATUS USING THE SAME

This application claims the benefit of Korean Patent Application No. 10-2005-0121608, filed on Dec. 12, 2005, which is hereby incorporated by reference as if fully set forth herein.

BACKGROUND OF THE INVENTION

1. Field of the Invention

The present invention relates to a video apparatus such as a digital television receiver having a personal video recorder or PVR, and more particularly, to a method of reproducing a transport stream in a video apparatus and a video apparatus using the same.

2. Discussion of the Related Art

A television receiver provided with a personal video recorder includes a storage medium such as a hard disc drive for recording (storing) and reproducing video signals including their associated audio components. The stored signals are digital video signals that are input to the television receiver and may be broadcast signals received from a broadcast station or other signals such as those supplied from a peripheral device connected to the television receiver. In any case, the input signals are encoded for storage in a transport stream format.

A transport stream received by a television receiver as above or by other video recording/reproducing apparatuses may be stored in and reproduced from the storage medium of a PVR while being received in real time according to a user selection of a time control function, which provides playback functions of pause, reverse play, fast or slow play, and the like for a real-time broadcast or other, similarly received, video stream. According to a contemporary digital television receiver, such a time control function enables a user to selectively execute the time control function, whereby the television receiver records (stores) a transport stream received in real time. The transport stream is stored in a PVR storage medium in an area specifically allocated for performing the time control function. By activating the time control function, a simple visual guide such as a progress bar is displayed via an on-screen display (OSD) function for user reference. The displayed progress bar represents a quantity of the stream that has been stored in the allocated area and enables a selective reproduction of the stored stream, beginning from any point of its progressing storage. That is, an OSD screen for the time control function includes a progress bar indicating a storage status of a received transport stream, and if a user designates a specific point on the progress bar, the television receiver begins reproducing the stored stream from a reproduction point corresponding to the designated point, while the same stream continues to be received and stored in real time.

In the contemporary digital television receiver as described above, however, the progress bar represents only the storage status of the transport stream. As such, a user has difficulty in identifying a specific point from which to perform an instance of reproduction as desired, so that a user is forced to make a guess as to the desired point of reproduction or to perform a cumbersome search process for locating the desired reproduction point. For example, to repeat a viewing of a particular portion of a stream being stored in real time while a time control function is activated or in the event that a user desires a subsequent reproduction of a particular portion of interest in a stored stream, say, from a point where a previous instance of viewing left off or from some other noteworthy point, the user is forced to belabor a tedious manipulation of the progress bar to attempt to select a precise point to begin an instance of reproduction.

SUMMARY OF THE INVENTION

Accordingly, the present invention is directed to a transport stream reproducing method and a video apparatus using the same that substantially obviates one or more problems due to limitations and disadvantages of the related art.

An object of the present invention is to provide a method of reproducing a transport stream in a video apparatus and a video apparatus using the same, which facilitates the location of at least one specific point of reproduction of a stored transport stream such as broadcast signal, so that the transport stream may be selectively reproduced by a user as desired from the at least one reproduction point, using a time control function.

Another object of the present invention is to provide a method of reproducing a transport stream in a video apparatus and a video apparatus using the same, by which a specific point of reproduction of a transport stream stored in real time can be easily found and reproduced using a bookmark for selecting the specific reproduction point, while the transport stream is being stored in real time according to a time control function.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages in accordance with the purpose of the invention, as embodied and broadly described herein, the present invention relates to a time control function for a data stream being received in real time and uses file identification information stored by packets as information for performing a reproduction from a specific point of reproduction of a transport stream stored in a storage unit in a random address sequence. Thus, bookmark information indicative of a position—or, in the case of several bookmarks, a number—of a bookmark set on a progress bar and random position (address) assignment information of the storage unit can be used by a controller to reproduce the packets of a transport stream randomly stored using a hard disc drive, starting from a specific reproduction point, as desired.

According to another aspect of the present invention, there is provided a method of reproducing a transport stream in a video apparatus including a personal video recorder for storing according to a time control function a transport stream constructed of a plurality of transport packets. The method comprises storing, in the personal video recorder, the transport stream together with file identification information corresponding to packets of the transport stream; displaying a progress bar indicating a progress status of the storing of the transport stream; storing, in a first storage unit, bookmark information set in response to a user command input for setting at least one bookmark with respect to the displayed progress bar, the bookmark information corresponding to the file identification information of at least one packet among the transport packets constructing the stored transport stream; displaying the at least one bookmark on the progress bar at a position corresponding to the user command input; and reproducing, in response to a bookmark selection made by a user selecting one of the at least one bookmark, the stored transport stream from the at least one packet corresponding to the set at least one bookmark, the reproducing using the file identification information of a packet corresponding to the selected bookmark.

According to another aspect of the present invention, there is provided a television receiver comprising a personal video recorder for storing, in response to a user selection, a transport stream constructed of a plurality of transport packets received in real time, the stored transport stream being stored together with file identification information; an on-screen display generator for generating, in response to the user selection, a progress bar indicating a storage progress status of the received transport stream and for generating at least one bookmark for display at a prescribed position on the progress bar, the at least one bookmark being generated in response to a user command input for setting bookmarks with respect to the displayed progress bar; a first storage unit for storing bookmark information set in response to the user command input, the bookmark information corresponding to the file identification information of at least one packet among the transport packets constructing the stored transport stream; a display module for displaying the progress bar and the at least one bookmark superposed over one of the received transport stream and the stored transport stream; and a controller for reproducing, in response to a bookmark selection made by a user selecting one of the at least one bookmark, the stored transport stream from the at least one packet corresponding to the set at least one bookmark, using the file identification information of a packet corresponding to the selected bookmark.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to exemplary embodiments of the present invention, examples of which are illustrated in the accompanying drawings. Wherever possible, like reference designations will be used throughout the drawings to refer to the same or similar parts.

The present invention is applicable to video apparatuses capable of storing a video signal received from various input sources such as a tuner or a peripheral device. For example, a tuner 101 may be provided to receive a user-specified broadcast signal by tuning among available terrestrial or cable broadcast signals to thereby provide a digital input signal or an analog input signal, and a peripheral device such as a digital camcorder or DVD player may be connected to a television receiver via an external signal input port 102 for supplying a video signal to be stored. The video signal input to a video apparatus adopting the present invention is encoded to provide a data stream configured in a transport packet format, i.e., a plurality of serially arranged transport packets each comprising a header and a payload. While a digital broadcast signal as provided from a broadcast station is already configured in a transport stream format, an analog broadcast signal may be encoded locally. The video signal from a peripheral device may require similar encoding prior to storage as a transport stream (TS). The present invention is exemplified herein by describing a television receiver having a personal video recorder or PVR.

Figure 1A:
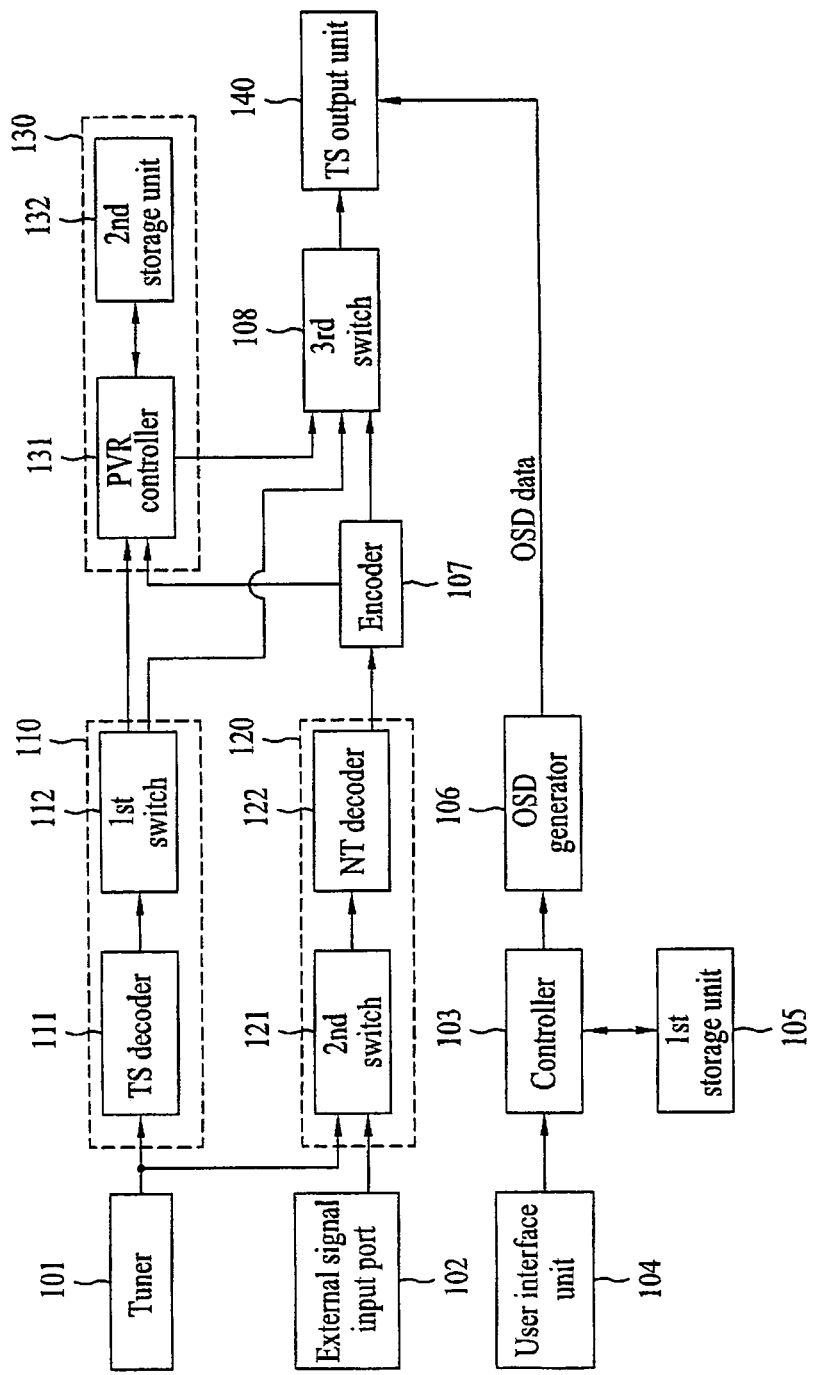
FIG. 1A is a block diagram of a television receiver having a PVR according to the present invention.

Referring to FIG. 1, a television receiver according to the present invention includes a controller 103 for receiving a user selection signal via a user interface unit 104, e.g., a remote controller or local keypad, to control the system and to perform a time control function using a first storage unit 105 and for outputting on-screen display (OSD) data to an OSD generator 106 according to an operation of the time control function; a digital broadcast signal processor 110 for processing a digital input signal from the tuner 101, using a TS decoder 111 and a first switch 112; an analog broadcast signal processor 120 for processing an analog input signal from the tuner, using a second switch 121 and an NTSC (NT) decoder 122; a PVR unit 130, including a PVR controller 131 and a second storage unit 132, for storing and reproducing the digital input signal or the analog input signal, which may be a tuned signal input supplied from the tuner and encoded by an encoder 107 or a video signal input from the external signal input port 102 and similarly encoded; a third switch 108; and a TS output unit 140 for outputting (displaying) a transport stream, e.g., broadcast signal, provided by the digital or analog broadcast signal processors or the PVR unit. The controller 103 communicates with each of the above elements via a bus (not shown) for providing control signals according to a user selection made via the user interface unit 104 and a program stored in the first storage unit 105, e.g., a general memory device different from the second storage unit 132, which as a rule requires a significantly greater capacity than the first storage unit.

The third switch 108 selects a signal to be processed by the TS output unit 140. The selected signal may be the output of the digital signal processor 110, i.e., a received digital broadcast signal; the output of the encoder 107, i.e., a received signal such as an analog broadcast signal or peripheral device input that has been encoded into a transport stream format; or the output of the PVR unit 130, i.e., the stored transport stream that is being reproduced. That is, the third switch 108 has three inputs and one selectable output.

Figure 1B:
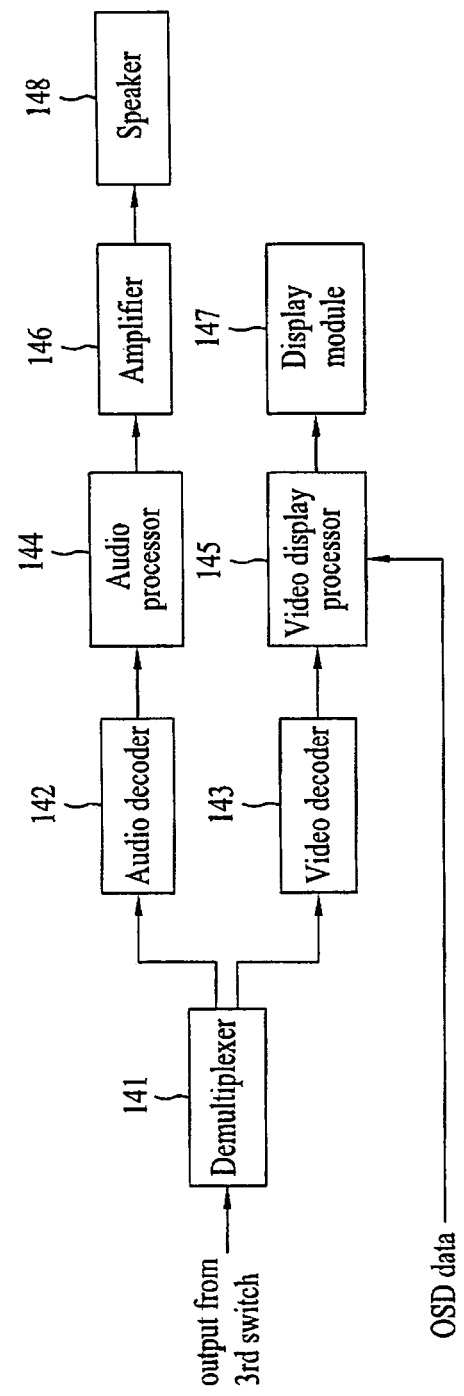
FIG. 1B is a block diagram of a TS output unit shown in FIG. 1A.

An example of the transport stream output unit 140 may be seen in FIG. 1B. Here, the TS output unit 140 includes a demultiplexer 141 for outputting separated data streams, i.e., a video stream and an audio stream, an audio decoder 142, a video decoder 143, an audio processor 144, a video display processor 145, an amplifier 146, a display module 147, and a speaker 148. The audio decoder 142 and the video decoder 142 decode the data streams separately output from the demultiplexer 141 and respectively provide the decoded streams to the audio processor 144 and the video display processor 145. The audio processor 144, amplifier 146, and speaker 148 convert the decoded audio signal into an audible audio signal. The video display processor 145 processes the decoded video signal to be displayed by the display module 147, which may be a PDP module, an LCD module, or a flat CRT module, while overlaying (supposing) OSD data from the OSD generator 106, such that the OSD data is displayed together with the processed video signal.

The digital broadcast signal processor 110 receives a digital broadcast signal from the tuner 101. The TS decoder 111 of the digital broadcast signal processor 110 decodes the received signal, to output separated data streams to the first switch 112. The output data streams include a video stream, one or more audio streams, and a stream of additional information associated with the video and audio streams. According to a control of the controller 103, the first switch 112 selectively outputs the data streams to the PVR unit 130, to the TS output unit 140, or to both.

The analog broadcast signal processor 120 receives an analog broadcast signal from the tuner 101 or a video signal input from the external signal input port 102. The second switch 121 of the analog broadcast signal processor 120 selects one of the two signals according to a control of the controller 103, to output the selected signal to the NT decoder 120, which decodes the received signal and outputs separated audio data and video data. This data is then encoded by the encoder 107 into a transport stream format, such as an MPEG signal, for storage the PVR unit 130 or processing by the TS output unit 140.

The PVR unit 130 receives a digital broadcast signal from the digital broadcast signal processor 110 or a video signal input from the analog broadcast signal processor 120 and encoded by the encoder 107. Accordingly, the PVR controller 131 of the PVR unit 130 receives a transport stream and stores the received transport stream in the second storage unit 132 under the control of the controller 103.

Figure 2:
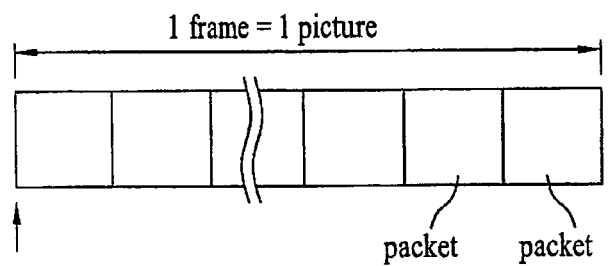
FIG. 2 is a diagram of a frame configuration in a transport stream stored in a second storage unit shown in FIG. 1.

FIG. 2 shows one frame, which is constructed of a predetermined number of packets, and one frame is a unit for configuring a transport stream and corresponds to one picture. According to the present invention, in storing a transport stream in the PVR unit 130, and specifically in the second storage unit 132, the controller 103 controls the PVR controller 131 to set file identification information by a frame unit configuring one picture in headers of packets configuring the transport stream. The file identification information includes picture-type information, a frame identifier, and offset information. The picture-type information indicates a corresponding picture of a group of pictures, namely, one of an I-picture, a B-picture, and a P-picture; the frame identifier indicates a sequence of picture groups of a file corresponding to the stored transport stream, for example, by designating a number to correspond to a picture's place in the sequence; and the offset information indicates a distance from a start position of the file (i.e., the stored transport stream) to the picture identified by the frame identifier.

Figure 3:
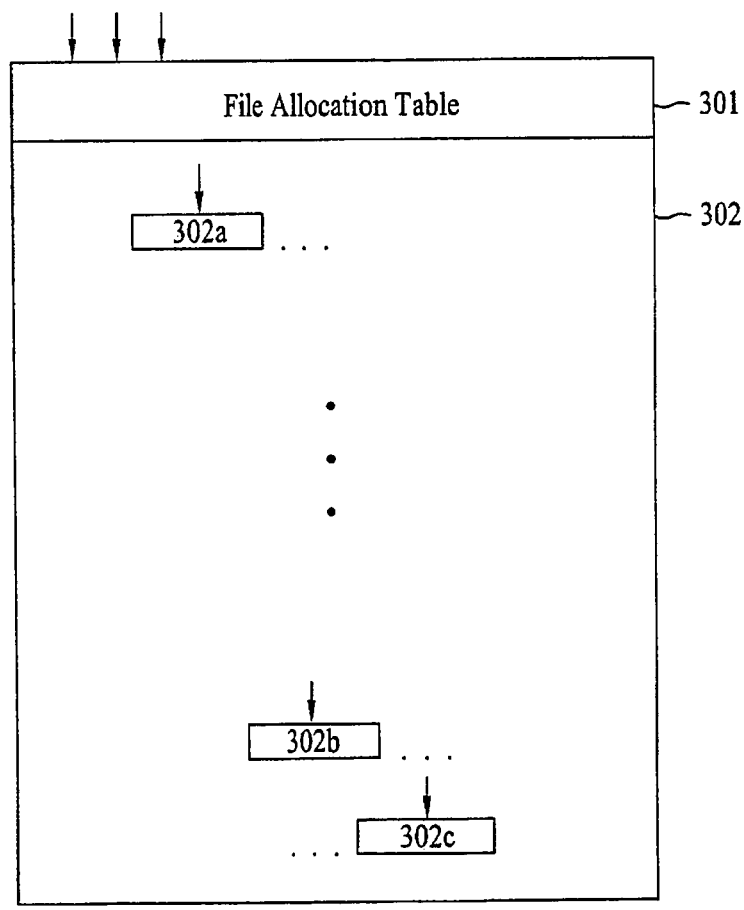
FIG. 3 is a diagram for explaining a configuration and operation of a second storage unit shown in FIG. 1.

Referring to FIG. 3, the second storage unit 132 of the PVR unit 130 may be a hard disc of a hard disc drive and includes a file allocation table 301 and a time control storage area 302, i.e., an area allocated for the time control function. When inputting (storing) a transport stream via the PVR controller 131 or encoder 107, the file allocation table 301 sequentially allocates the transport stream to prescribed positions of the hard disc area (time control storage area) by packet units, e.g., packets 302a, 302b, and 302c. The file allocation table 301 contains information identifying the allocation position of each packet so that, in reproducing the stored transport stream, the packets may be output in the correct sequence by the controller 103.

In more detail, packets of a transport stream are stored in allocated positions within the time control storage area 302, in the same sequence of their input, namely, according to the reception of an incoming data stream. In doing so, due to the characteristics of the hard disc, the packets are stored in a random address (position) sequence instead of a sequence adhering to discrete address. Here, the random address sequence is used to increase storage efficiency and is applied since the quantity of data differs from packet to packet and since a typical transport stream includes packets having no payload data at all. The random address in a time control storage area 302 corresponding to a stored stream or a stream being stored in the second storage unit 132 is provided to the controller 103 by the PVR controller 131, but the present invention is particularly relevant to a time control function for a stream being received in real time.

In reproducing a transport stream, a specific position among various sections of one or more stored transport streams. To do so, the controller 103 uses the file identification information recorded in the packet headers and the position allocation information stored in the file allocation table 301. Thus, the controller 103 recognizes the start point (start of file) and end point (end of file) of a data stream (file) in the time control storage area 302 of the second storage unit 132 by storing in the first storage unit 105 information indicative of these points. Therefore, even if an initial portion of the transport stream is erased (overwritten) as a new stream is later stored from a start point of the time control storage area, a user can precisely locate a specific position (point of reproduction) of the remainder of the stored transport stream, using the file identification information set in each of the headers and the position allocation information of the file allocation table.

If, in the course of executing the time control function, and typically as the user is viewing the stored file, a user command for setting a bookmark at a prescribed position on a progress bar is input via the user interface unit 104, the controller 103 stores in the first storage unit 105 bookmark position information and controls the PVR controller 131 to store in the second storage unit 132 file identification information corresponding to the bookmark positions set for the transport stream being recorded by the PVR unit 130. Here, the bookmark position information is indicative of a specific bookmark or bookmarks as set by the user, per the user command input, to be disposed along the progress bar displayed during the reproduction of a stored transport stream, and the file identification information corresponds to the bookmarks set for each transport stream (file) stored in the second storage unit 132. Therefore, the first storage unit 105 is capable of storing the information of at least one bookmark, and preferably several bookmarks simultaneously, according to the stored stream or streams.

When the time control function of the present invention is executed according to a manipulation of the user interface unit 104 and a corresponding control of the controller 103, the OSD generator 106 is thereby controlled to generate OSD data for constructing a progress bar 500 to be displayed on a screen 147a of the display module 147 (see FIG. 5) according to a current operation of the time control function using the displayed progress bar. Further user manipulation of the user interface unit 104 may be performed to generate one or more bookmarks 501 as part of the OSD data to be displayed on the progress bar 500. The progress bar 500 corresponds to a quantity of a data stream that can be stored in the time control storage area 302 as allocated within the second storage unit 132 and enables a user to designate at least one point of reproduction of the stored stream.

If a set bookmark is selected via the user interface unit 104, the controller 103 reads the bookmark information stored in the first storage unit 105 in correspondence with the bookmark, i.e., the position information of the bookmark on the progress bar and the file identification information corresponding to the position, and using the read file identification information, searches the second storage unit 132 for a packet corresponding to the bookmark position. The controller 103 then controls the PVR unit 130 to reproduce the transport stream from the searched packet.

Figure 4:
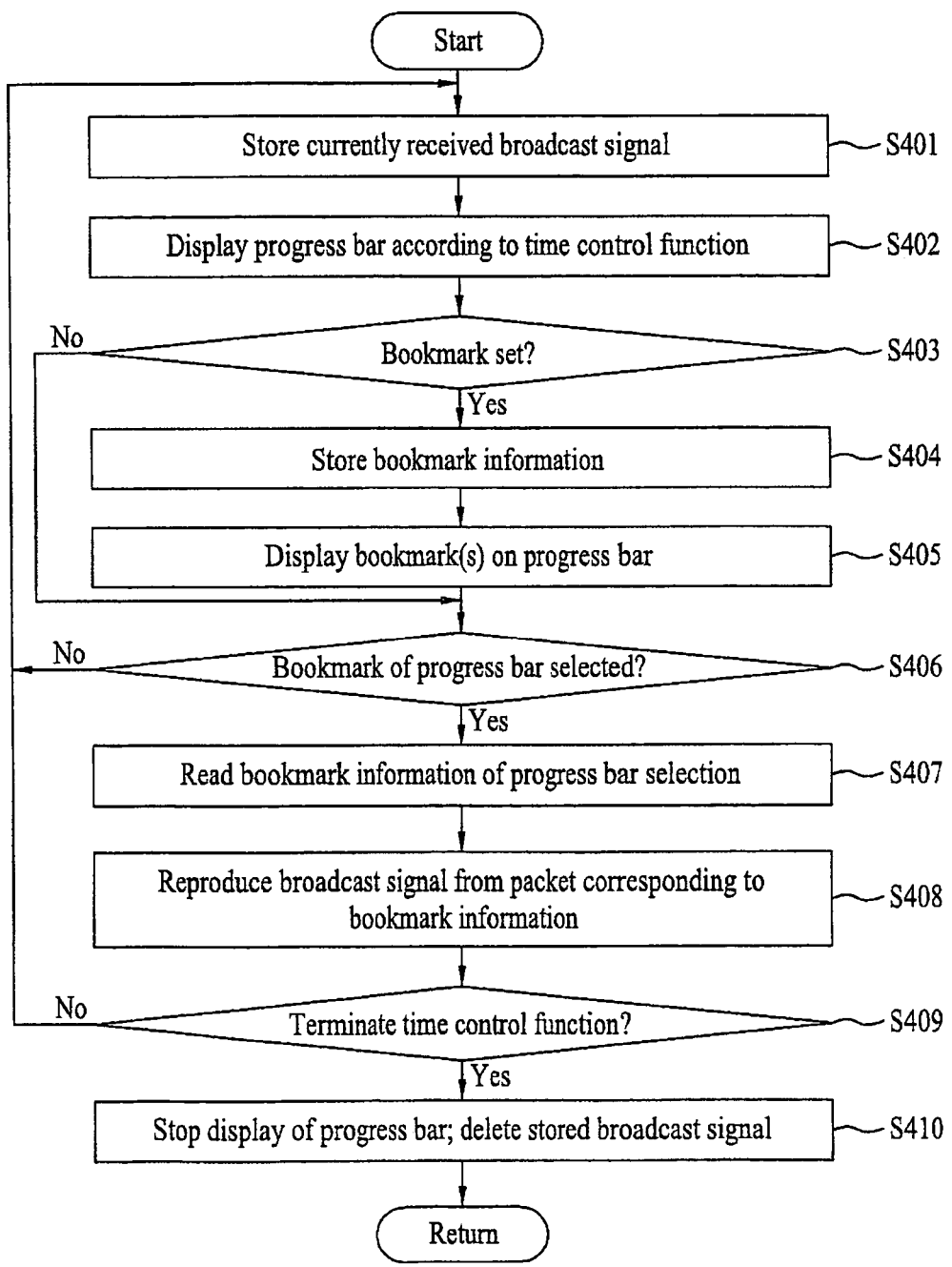
FIG. 4 is a flowchart of a method according to the present invention.

FIG. 4 illustrates a method of reproducing a transport stream in a video apparatus according to the present invention, whereby a time control function is first executed by operating the user interface unit 106. Initiation of a time control function also causes an execution of a video recording (storing) process. An initiation of video storing may also cause a simultaneous performance of the time control function according to the present invention.

Figure 5:
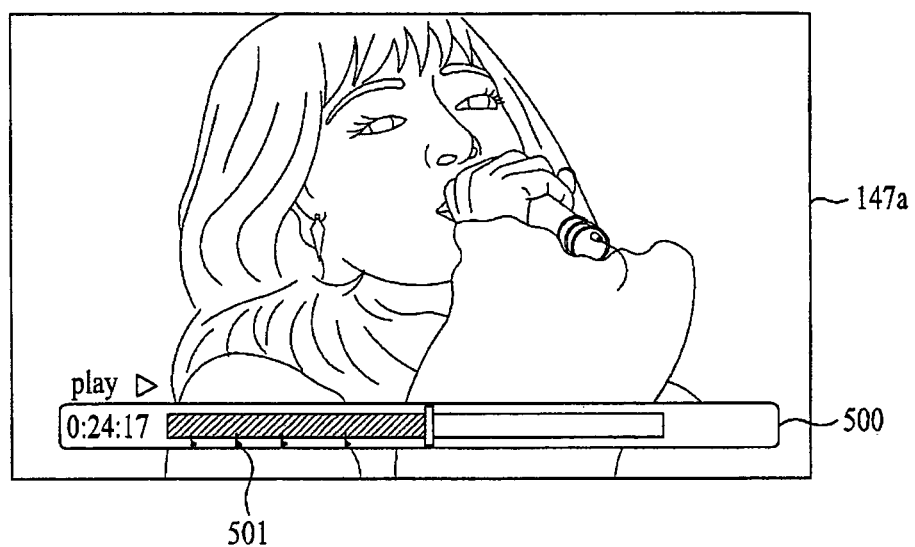
FIG. 5 is an exemplary diagram of a time control progress bar displayed according to the present invention.

Accordingly, once a time control function is executed according to a user selection as above, the controller 102 controls the PVR unit 130 to store a currently received transport stream in the time control storage area of the second storage unit 132 (S401). Subsequently, the OSD generator generates time control OSD data for indicating the stream's storage status and a specific (i.e., past) point of reproduction of the stored stream according to the time control function. The generated OSD data is represented as a progress bar, which superposes the video signal corresponding to the reproduction point and is displayed via the video display processor 145 and the display module 147 as shown in FIG. 5 (S402). The displayed progress bar indicates, for user recognition, a storage progress status corresponding to a process of storing in the time control storage area a transport stream that is being received in real time by the video apparatus adopting the present invention.

With the progress bar displayed as above and the transport stream being reproduced for viewing, if the user interface unit 104 is operated to input a user command for setting a bookmark with respect the progress bar (S403), i.e., a specific bookmark selection made by the user, the controller 103 stores in the first storage unit 105 bookmark information including the file identification information of the corresponding packet and corresponding position allocation information of the time control storage area in which the current transport stream is being stored (S404). That is, the position allocation information and bookmark information correspond to a specific bookmark setting along the displayed progress bar, and multiple such settings may be performed using corresponding sets of position allocation and bookmark information stored for each user command for setting a bookmark. Thus, according to the present invention, information corresponding to at least one bookmark 501 can be stored according to a user command for setting a bookmark or bookmarks, and each bookmark serves identify a specific packet of the transport stream. User commands for bookmark setting are input while viewing the reproduced stream in real time on the display module 147, so that a bookmark's position can be determined with precision relative to the stored stream. Based on the stored bookmark information, the controller 103 controls the OSD generator 106 to generate OSD data for identifying the bookmark(s) at corresponding reproduction points along the progress bar, and the generated OSD data is output to the video display processor 145. Hence, each bookmark is displayed along the progress bar in correspondence to the user selected points of reproduction, to thereby be displayed at a position or positions along the progress bar relative to the specific packet of the transport stream (S405). The progress bar 500 may be redisplayed by including the OSD data generated, i.e., updated, in accordance with each bookmark set in the step S403 and the bookmark information stored in the step S404.

With bookmarks thus displayed, for example, as in FIG. 5, the controller 103 determines whether any one of the displayed bookmarks is selected by a user via the user interface unit 104, thereby entering a reproduction request signal (S406). Here, the user may reference the progress bar having the time control function of the present invention to differentiate between multiple bookmarks corresponding to multiple points of reproduction.

If a bookmark is thus selected, the controller 103 reads from the first storage unit 105 the bookmark information corresponding to the selected bookmark and, using the read bookmark information, searches the time control storage area for the packet occurring at the corresponding reproduction point (S407). Based on this bookmark information and storage area search, the controller 103 controls the PVR unit 130 to output by sequentially reproducing the stored transport stream from (i.e., beginning at) the packet stored in the time control storage area at the position corresponding to the bookmark (S408). While the stored broadcast signal is being reproduced, the controller 103 may determine whether the time control function is to be terminated, for example, according to a user manipulation of the user interface unit 104 or by reaching the end of the stream, and if so, stops the display of the progress bar and the transport stream stored thus far may be deleted (S409, S410). Here, the user option of terminating the time control function may be disabled until completion of the selected reproduction, since the reproduced stream is based on the stored stream.

According to the present invention as described above, the bookmark position information, the position allocation information of the storage medium, and the file identification information are used as bookmark information. Alternatively, the bookmark information may be configured with a bookmark setup time by storing reception time information in storing a received transport stream, whereby a transport stream stored with respect to a corresponding time can be reproduced for a user selection of the corresponding bookmark, such that the stored stream is reproduced from a packet identified with respect to its reception time. In particular, initiation of a time control function causes a storage (e.g., in the first storage unit 105) of a broadcast signal or transport stream (input video signal) received in real time and corresponding reception time information. Then, if a bookmark setting command is received while the input video signal is being stored and displayed (see steps S401~S403), current time information is stored and corresponding bookmarks are displayed via the progress bar (see steps S404 & S405). If a bookmark is selected (see step S406), the time information corresponding to the selected bookmark is read from the storage medium to enable a search of the time control storage area for the packet identified by the time information, and a reproduction of the stored stream is carried out from a packet stored in correspondence to the time information (see steps S407 & S408).

The present invention may be embodied by a computer readable medium including a program command for performing an operation implemented by various computers. The computer readable medium may include a program command, a data file, a data structure, or a combination of these. The program command of the medium may be adaptively configured and designed according to the present invention but is knowable to those skilled in the art of computer software.

According to the present invention, a user selection and reproduction of a specific part of a transport stream (e.g., a received broadcast signal) stored in real time is facilitated using a bookmark generated and displayed according to the operation of a time control function. Thus, the present invention obviates the need for a user to perform a manual search of a stored data stream to locate a desired portion for viewing or reproduction.

It will be apparent to those skilled in the art that various modifications can be made in the present invention without departing from the spirit or scope of the invention. Thus, it is intended that the present invention covers such modifications provided they come within the scope of the appended claims and their equivalents.

What is claimed is:

1. A method of reproducing video data in a video apparatus including or coupled to a storage unit for storing the video data, the method comprising:
    storing, in the storage unit, the video data and file identification information corresponding to video frames of the video data;
    displaying a progress bar indicating a progress status of said storing of the video data;
    storing, in the storage unit, bookmark information set in response to a user command input for setting at least one bookmark with respect to the displayed progress bar, the bookmark information corresponding to the file identification information of at least one video frame among the video frames;
    displaying a visual indication of the at least one bookmark relative to the progress bar at a position corresponding to the user command input; and
    reproducing, in response to a user selecting the visual indication of the at least one bookmark displayed relative to the progress bar, the stored video data from the at least one video frame corresponding to the at least one set bookmark, said reproducing performed based on the file identification information of a video frame corresponding to the selected bookmark,
    wherein
    the reproduced video data is configured to be stopped according to a time control function,
    wherein the stopped video data is stored from a stop point based on the time control function, and
    wherein a visual indication of a bookmark for the stopped video data does not generate on the progress bar.

2. The method of claim 1, wherein the transport stream is stored in response to a user selection of a time control function.

3. The method of claim 1, wherein said storing of the transport stream initiates execution of a time control function.

4. The method of claim 1, wherein the bookmark information comprises position information of the at least one bookmark relative to the progress bar.

5. The method of claim 1, wherein the bookmark information comprises bookmark position information and position allocation information corresponding to the at least one packet in addition to the file identification information.

6. The method of claim 1, wherein the file identification information comprises:
    picture type information for identifying which of at least one of an I-picture, a B-picture, or a P-picture corresponds to the at least one packet;
    a frame identifier for identifying a sequence of picture groups of a file corresponding to the stored transport stream; and
    offset information for indicating a distance from a start position of the file to the picture identified by the frame identifier.

7. The method of claim 1, wherein the plurality of transport packets correspond to at least one frame corresponding to one picture.

8. The method of claim 1, wherein each of the plurality of transport packets comprises a header and a payload and wherein the file identification information is loaded in the header of each packet.

9. The method of claim 1, wherein the visual indication of the at least one bookmark is displayed at a position along the progress bar that corresponds to the at least one packet of the stored transport stream.

10. The method of claim 1, wherein said displaying of the visual indication of the at least one bookmark is performed by redisplaying the progress bar including or based on updated OSD data generated according to the at least one bookmark.

11. The method of claim 1, wherein the packets of the transport stream are stored in the personal video recorder in a random address sequence.

12. The method of claim 1, further comprising:
    storing allocation information indicative of a position in a memory storing the at least one packet corresponding to the set bookmark, wherein said reproducing includes:
    when a portion of the transport stream before the at least one packet has been overwritten or erased, reproducing the stored transport stream from the at least one packet based on the allocation information and file identification information corresponding to the at least one packet corresponding to the set bookmark in response to the user command.

13. A television receiver, comprising:
    a storage unit for storing, in response to a user selection, video data including a plurality of video frames, file identification information corresponding to the video frames of the video data and bookmark information set in response to an user command input, the bookmark information corresponding to the file identification information of at least one video frame among the video frames;
    an on-screen display generator for generating, in response to the user selection, a progress bar indicating a storage progress status of the video data and for generating at least one bookmark for display at a prescribed position relative to the progress bar, the at least one bookmark being generated in response to a user command input for setting the bookmark with respect to the displayed progress bar;
    a display module for displaying the progress bar and a visual indication of the at least one bookmark simultaneously with display of the stored video data; and
    a controller for reproducing, in response to selection of the visual indication of the at least one bookmark by a user, the stored video data from the at least one video frame corresponding to the set at least one bookmark, the controller reproducing the stored video data from the at least one video frame based on the file identification information of the at least one video frame corresponding to the selected bookmark,
    wherein
    the reproduced video data is configured to be stopped according to a time control function, wherein the stopped video data is stored from a stop point based on the time control function, and wherein a visual indication of a bookmark for the stopped video data does not generate on the progress bar.

14. The television receiver of claim 13, wherein the file identification information of the packet corresponding to the selected bookmark is also stored in said first storage unit.

15. The television receiver of claim 13, wherein the progress bar indicates a storage progress status of the transport stream into an allocated time control function storage area.

16. The television receiver of claim 13, said second storage unit comprising:
   a file allocation table for allocating at least one address by a frame unit in a random sequence, the at least one address being allocated to the transport stream stored in said second storage unit; and
   a storage area for storing and outputting frames according to the allocated at least one address.

17. The television receiver of claim 13, wherein the file identification information comprises:
   picture type information for identifying at least one of an I-picture, a B-picture, or a P-picture that corresponds to the at least one packet;
   a frame identifier for identifying a sequence of picture groups of a file corresponding to the stored transport stream; and
   offset information for indicating a distance from a start position of the file to the picture identified by the frame identifier.

18. The television receiver of claim 13, wherein the plurality of transport packets correspond to at least one frame corresponding to one picture.

19. The television receiver of claim 13, wherein each of the plurality of transport packets comprises a header and a payload and wherein the file identification information is loaded in the header of each packet.

* * * * *